United States Patent

Maure et al.

[15] 3,676,864

[45] July 11, 1972

[54] OPTICAL MEMORY APPARATUS

[72] Inventors: Douglas Raymond Maure, Santa Ana; Barry Glenn Broome, Azusa, both of Calif.

[73] Assignee: Optical Memory Systems, Inc., Santa Ana, Calif.

[22] Filed: June 29, 1970

[21] Appl. No.: 50,367

[52] U.S. Cl. ................340/173 LM, 250/220 M, 350/160 R, 250/219 D

[51] Int. Cl. ..........................................................G11c 13/04

[58] Field of Search ..............340/173 LM; 350/160, 160 RP; 250/219 F, 220 MX, 219 Q, 219 D, 220 M; 235/61.115; 353/25, 27

[56] References Cited

UNITED STATES PATENTS

| | | | |
|---|---|---|---|
| 3,096,431 | 7/1963 | Schmidlin | 340/173 LM |
| 3,479,652 | 11/1969 | Foster | 340/173 LM |
| 2,984,750 | 5/1961 | Herriott | 340/173 LM |
| 3,042,912 | 7/1962 | Gilbert | 340/173 LM |

*Primary Examiner*—Stanley M. Urynowicz, Jr.
*Attorney*—Jackson & Jones

[57] ABSTRACT

An optical apparatus is disclosed having a lens system positioned between an array of light emitters and an array of light sensors for ensuring optimum energy transfer therebetween. In the apparatus, optical masks are positioned between the arrays of light emitters and light sensors with each mask having a bit location defined where each light transmission path between an emitter and a sensor intersects the mask. The lens system comprises an array of condenser lenses for concentrating the light energy from the emitters and projecting it through each mask to either a segmented primary lens or an image relay lens-combining lens combination, either of which functions to superimpose the images of all the masks onto a common image plane. The light sensors are positioned at the respective superimposed bit locations on the image plane for receiving the light energy projected thereon.

18 Claims, 3 Drawing Figures

INVENTORS
DOUGLAS RAYMOND MAURE
BARRY GLENN BROOME
BY
Jackson & Jones
ATTORNEYS.

INVENTORS.
DOUGLAS RAYMOND MAURE
BARRY GLENN BROOME
BY
Jackson + Jones
ATTORNEYS.

Patented July 11, 1972

3,676,864

3 Sheets-Sheet 3

INVENTORS.
DOUGLAS RAYMOND MAURE
BARRY GLENN BROOME
BY
Jackson + Jones
ATTORNEYS.

OPTICAL MEMORY APPARATUS

BACKGROUND OF THE INVENTION

1. Field of the Invention

The present invention relates to optical logic devices and more particularly to optical systems located therein for increasing the intensity of the transmitted light energy.

2. Description of the Prior Art:

Logic devices such as read only memories are typically used to control the flow of information in digital computers and to effect conversions from one code to another.

The current general types of logic devices include transistor systems, magnetic systems, and optical systems. The transistor and magnetic systems both have two basic shortcomings. The first shortcoming is that both systems have relatively slow operating times (the time to read a given bit value) ranging from 300 to approximately 500 nanoseconds. Secondly the changing of individual bit values is extremely difficult in both systems since it involves either circuit or wiring modifications.

Optical logic overcomes these shortcomings by providing logic systems that have extremely fast operating times and have easily changeable, high bit densities.

An optical read only memory is described in a U.S. Pat. application, Ser. No. 830,594, entitled "Read Only Memory", filed June 5, 1969. In that system an array of light emitting elements and an array of light sensing elements are positioned on opposite sides of an optical mask with each emitting element preferably capable of directing light energy toward all of the sensing elements. Means are provided for selectively energizing the individual light emitting elements with the light transmitting paths between each emitting element and all the various sensing elements passing through the optical mask. A data bit location is defined on the mask where each transmission path intersects the mask, with each bit location being provided with either a light blocking or a light transmitting portion, depending on the desired bit value. The value of a given data bit is determined by interrogating the sensing device associated with the transmission path passing through the data bit location of interest on the mask.

The main advantages of such a device are: (1) the value of a given bit location may readily be changed by either applying suitable non-transmissive material to a bit location or conversely by erasing such non-transmissive material; and (2) the operating speed is limited only by the operating speeds of available photoemissive and photosensitive materials, with such materials currently available that are capable of operating in approximately a two nanosecond range.

Although such an optical system is a vast improvement over prior transistor and magnetic systems, it has been found that for large arrays of emitters and sensors, the energy loss through the mask is excessive.

SUMMARY OF THE INVENTION:

The present invention obviates the above-mentioned shortcomings by providing a lens system in an optical logic device that is capable of increasing the light energy impinging on the light sensors. The lens system comprises a first array of condenser lenses positioned between each emitter and its registering mask for concentrating the light energy from the emitters and projecting it through each mask to a small area. In one embodiment, the light passing through each mask is projected onto a portion of a primary lens which is preferably segmented and constructed to superimpose the images of all of the masks onto a common image plane. The array of light sensors are positioned at the respective superimposed bit locations on the common image plane for receiving the light energy projected thereon.

In a second embodiment, the light passing through each mask is projected through an array of image relay lenses. The array of masks are located at the focal plane of the relay lens array, thereby enabling the light rays from the mask passing through the relay lenses to be collimated. A combining lens, which is adapted to form an image of an infinitely distant object, is positioned with its axis parallel to the axes of the relay lens array for superimposing the images of all the masks onto a common image plane. As in the first embodiment, the light sensors are then positioned at the respective superimposed bit locations for receiving the light energy projected thereon.

A primary object of the present invention is to provide a lens system in an optical apparatus that ensures optimum energy transfer between the light emitters and the light sensors.

Another object of the present invention is to provide an optical apparatus having a lens system that materially increases the speed of the logic system and makes large systems containing thousands of sources and hundreds of sensors practical.

The features of the present invention which are believed to be novel are set forth with particularity in the appended claims. The present invention, both as to its organization and manner of operation, together with further objects and advantages thereof, may best be understood by reference to the following description, taken in connection with the accompanying drawings.

DESCRIPTION OF THE PREFERRED EMBODIMENT

Figure 1:
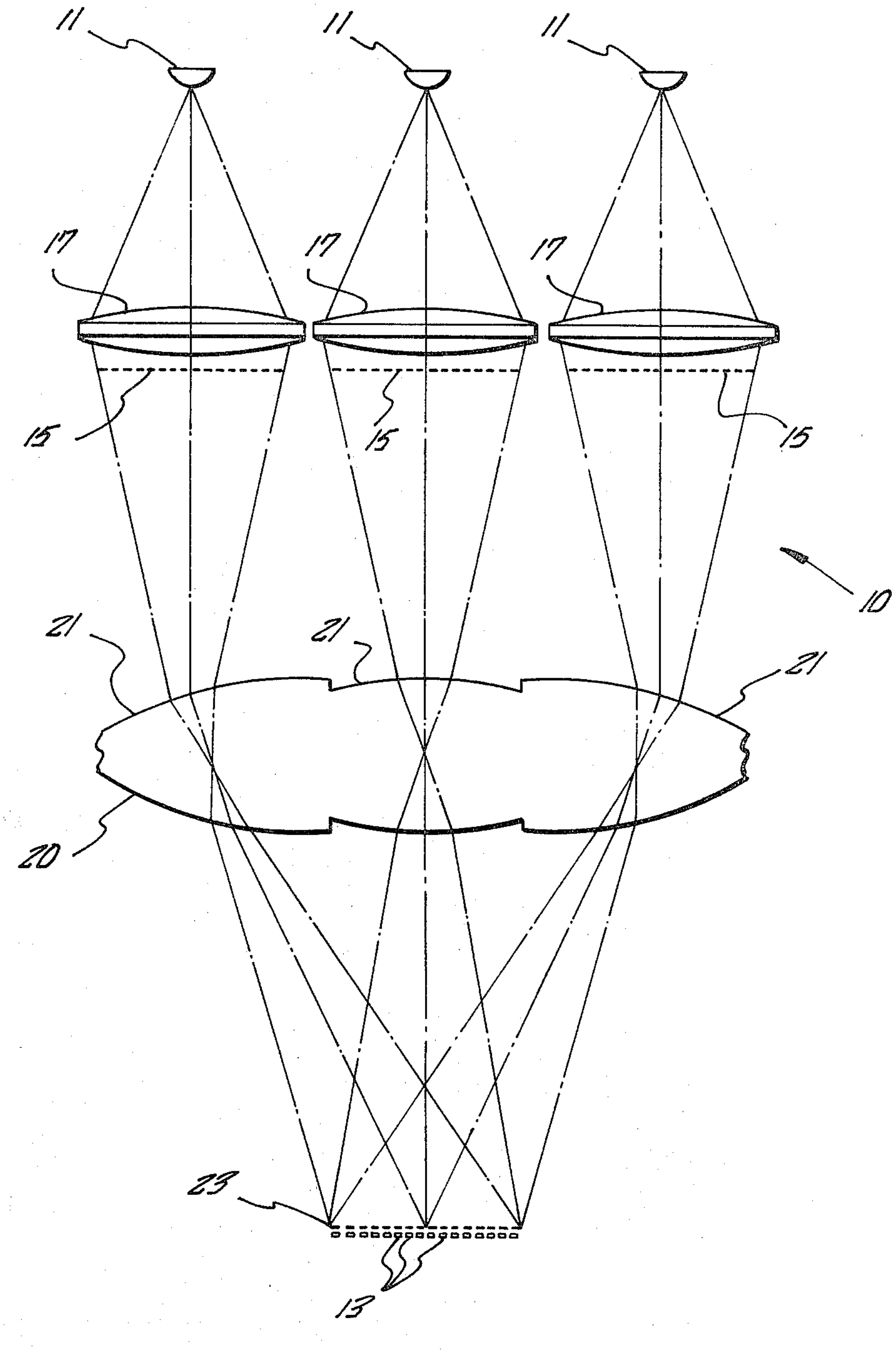
FIG. 1 is a fragmentary sectional view of the optical apparatus of the present invention.

Referring now to the drawings, FIG. 1 shows an optical apparatus, generally indicated by arrow 10, having an array of light emitters 11. Although not shown, the emitters 11 may be supported on any desired mounting surface. The apparatus 10 further comprises an array of light sensors 13, located on the opposite end thereof with an array of optical masks 15, one for each emitter 11, disposed therebetween. These elements are preferably housed in an enclosure (not shown) which is preferably coated with a suitable non-reflecting material to prevent internally reflected light or exterior light from affecting the operation of the memory.

Although the embodiment of FIG. 1 illustrates a light emitter array, three of which are shown, that is preferably arranged in a 16 × 16 matrix, and a light sensor array, of which one row is shown, that is also preferably arranged in a 16 × 16 matrix, it is clearly not a requirement to either have the number of sensors equal to the number of emitters or to arrange the emitter and sensor components in a matrix array. Any convenient number of mutually displaced emitters or mutually displaced sensors may be arranged in various geometric or non-geometric patterns, the only requirement being that it be possible to physically dispose the optical masks between the emitters and the sensors in such a manner that the masks intersect the light transmission paths from the light emitters to the light sensors.

Each light emitter 11 preferably directs light energy to each of the light sensors 13. As a result each emitter 11 has a total of 256 significant transmission paths associated with the light sensors, with the total amount of light transmission paths for the whole apparatus being 256 × 256 or 45,536.

The mask 15 associated with each light emitter 11 is positioned, in the manner to be hereinafter described, such that the 256 significant transmission paths intersect the mask 15 at 256 discrete intersection points, with each intersection point defining a data bit location. The value of each bit location is preset by providing the bit location with either a light transmissive or non-transmissive mask portion. The value of each bit location may also readily be changed by either applying a dark ink or other suitable non-transmissive material to a bit location or conversely by erasing such non-transmissive materials.

The value of each bit location is determined by selectively energizing the proper emitter 11 and interrogating the associated light sensor 13 to determine if light energy from the emitter 11 which defines the transmission path of interest is impinging thereon. Therefore, it can easily be determined whether each bit location is transmissive or non-transmissive by energization of the proper emitter 11 and interrogation of the proper sensor 13.

Again referring to FIG. 1, an array of condenser lenses 17 are positioned between each light emitter 11 and registering mask 15 to concentrate the light energy from the emitter 11 and project it through the mask 15 and onto a portion of a segmented primary lens 20. The primary lens 20 is formed of a plurality of segments 21, each of which is formed to image its respective optical mask 15 onto a common image plane 23. As a result the segmented lens 20 functions to superimpose the images of all the masks 15 onto the common image plane 23.

In accordance with the present invention, the 256 light sensors, of which one row of 16 is shown, are then positioned at the common image plane 23 at the respective superimposed bit locations. In this manner, any emitter 11 can be energized and any sensor 13 can be interrogated to determine whether the respective bit location is transmissive or non-transmissive.

In operation, means are provided for selectively energizing the individual light emitters 11. As one light emitter 11 is energized, the emitted light energy is transmitted through the corresponding condenser lens 17 through the registering mask 15. The mask object is then projected through a portion of the segmented lens 20 to be imaged at the common image plane 23. The value of a given data bit is determined by interrogating the sensor 13 associated with the superimposed data bit location.

The main advantages of the array of condenser lenses are: (1) the lenses enable substantially all of the light energy to pass through the masks onto the primary lens 20, thereby preventing the loss of useable light energy; and (2) by concentrating the light energy into a small area, the utilization of a segmented primary lens is possible.

Figure 2:
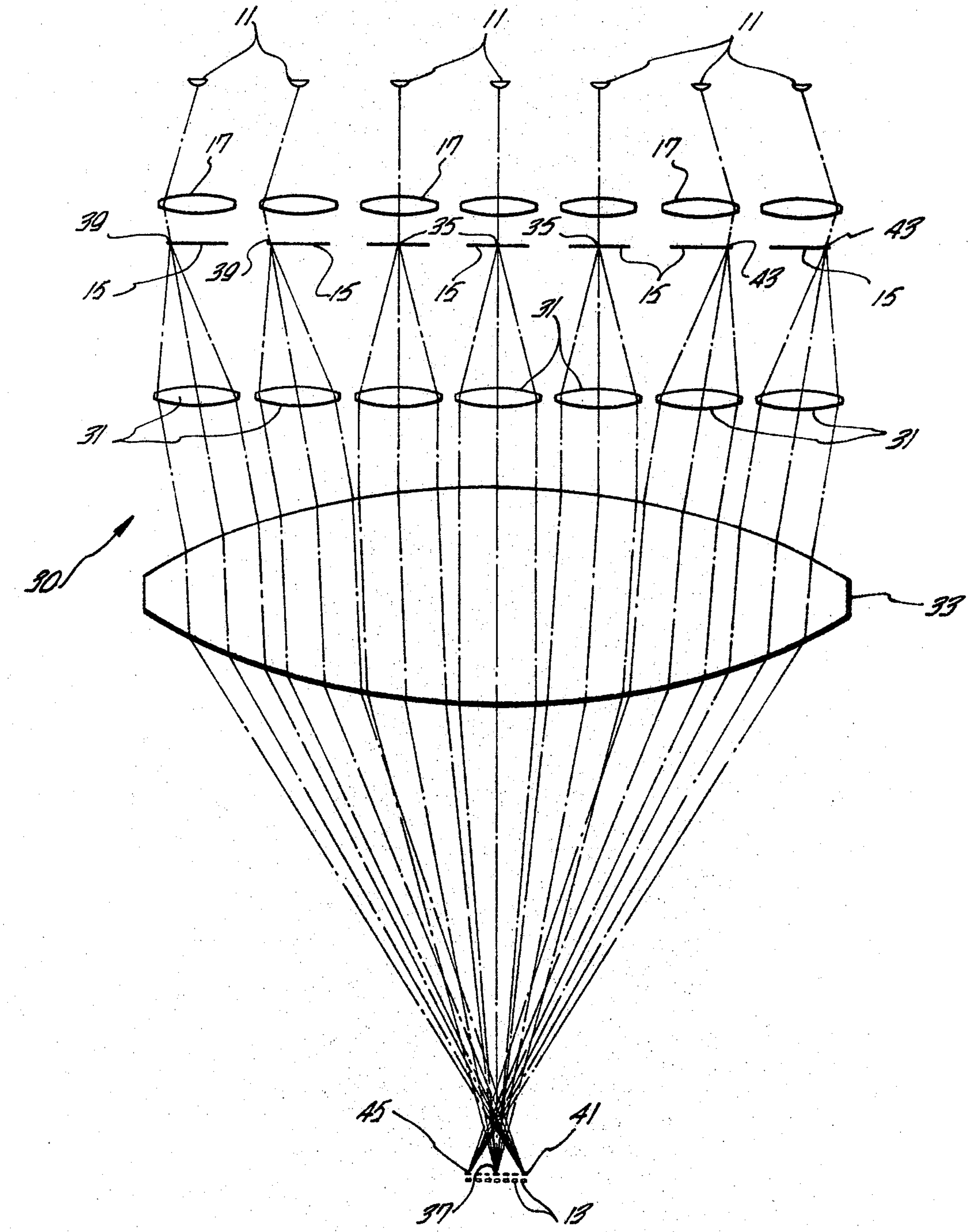
FIG. 2 is a fragmentary sectional view of a second embodiment of the present invention.
Figure 3:
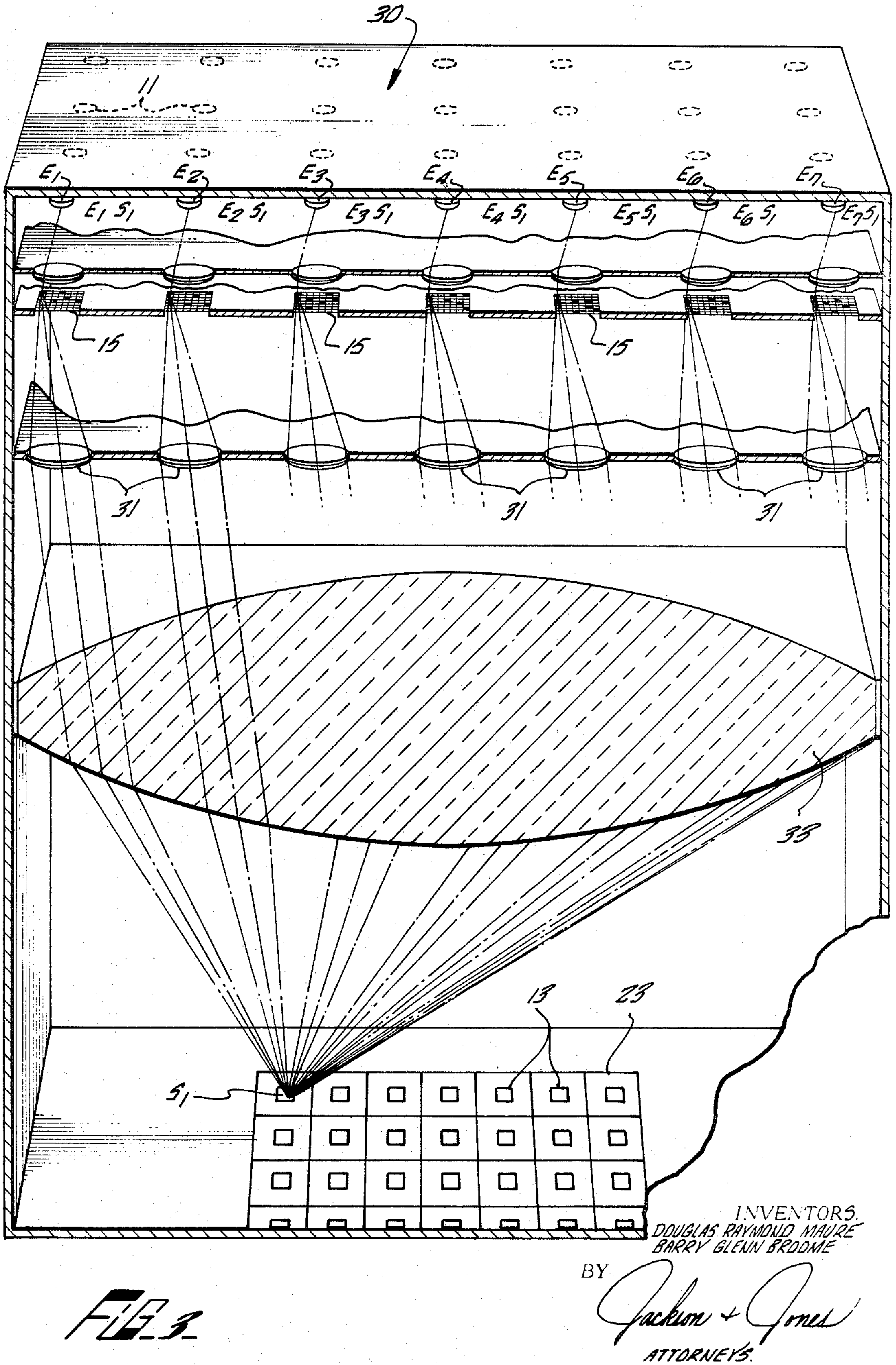
FIG. 3 is a perspective view of the optical apparatus utilizing the lens system of the second embodiment.

FIGS. 2 and 3 show a second embodiment of the optical apparatus, generally indicated by arrow 30, in which the arrays of the emitters 11, sensors 13, masks 15, and condenser lenses 17 are identical to the ones shown in the embodiment of FIG. 1. For illustrative purposes, each of the arrays are arranged in a 7 × 7 matrix.

In the second embodiment, an array of relay lenses 31 is provided to optically communicate with the respective masks 15, with each mask 15 being located at the focal plane of the relay lens array. This disposition enables the light rays projecting through the relay lenses 31 to be collimated.

A combining lens 33 is provided to optically communicate with the relay lens array 31 with the combining lens 33 being constructed to form an image of an infinitely distant object. As shown in FIG. 2, since the object point 35 located at the center of each mask (of which three are shown) produces light rays through the relay lens array which are all parallel to the combining lens axis and to one another, these rays will be converged at a common image point 37 by the combining lens 33. Moreover, the object point 39 located at the outermost left side of each mask (of which two are shown) produces light rays which are superimposed at a common image point 41 and the object point 43 located at the outermost right side of each mask (of which two are shown) produces light rays which are superimposed at a common image point 45. Similarly all other points (which correspond to data bit locations in the respective masks) are superimposed at common image points in the common image plane. As a result the array of relay lens 31 and the combining lens 33 function to superimpose the images of all the masks on a common image plane 35. As in the first embodiment, all of the light sensors 13 are positioned at the respective superimposed bit locations for receiving the light energy projected thereon.

As shown in FIG. 3, the light transmission path through a representative bit location on the corner of each mask will be described as an example of the operation of the apparatus. FOr illustrative purposes, the one row of emitters 11 will be described as $E_1$–$E_7$ while the corner of the superimposed image 23 has a sensor $S_1$ located thereon. The light transmission path from each emitter that travels through the corner data bit location of each mask 15 will be described as $E_1S_1$–$E_7S_1$. As can be seen each light transmission path $E_1S_1$–$E_7S_1$ is directed to the light sensor $S_1$ positioned at the superimposed image of the corner data bit location of each mask 15. Each corner bit location $E_1S_1$–$E_7S_1$ is preset by providing the locations with transmissive or non-transmissive mask portions.

The value of the corner bit location of each mask is defined by whether or not the location is darkened, indicating that it is a non-transmissive location, or is not darkened, indicating that it will transmit light. The value of the corner bit location is determined by selectively energizing the proper emitter $E_1$–$E_7$ and interrogating the associated light sensor $S_1$.

For example, the bit location $E_1S_1$ is transmissive, which fact may be determined by energizing emitter $E_1$ and interrogating sensor $S_1$. The bit location $E_2S_1$ is non-transmissive, which fact may be determined by energizing emitter $E_2$ and interrogating light sensor $S_1$.

The bit locations associated with each and every of the remaining light emitters are determined in the same manner in connection with any of the light sensors. Clearly, the bit locations will in the general case be determinable from the knowledge of the locations of the emitters, the sensors and the masks.

As can be seen, the basic operation of the second embodiment is identical to that of the first embodiment. The only difference is that, optically, a relay lens-combining lens combination is substituted for the segmented primary lens.

The main advantages of the combining lens 33 is that it can be more economically produced than the segmented lens 20 of the first embodiment.

Although the combining lens 33 is illustrated as a single lens, it could also be broken down into a multiple lens system to correct for spherical aberration and other types of abberation.

Because of the condensing lens system and the super-imposing lens means, the present invention as exemplified in the embodiments of FIGS. 1–3 provides an optical apparatus that materially increases the light energy impinging on the sensors from those not using any lens systems.

It should be noted that various modifications can be made to the apparatus while still remaining within the purview of the following claims.

What is claimed is:

1. In an optical memory apparatus the combination which comprises:

an optical storage mask divided into *m* portions, each *m* portion defining n discrete areas with each area being substantially opaque or transparent to represent a binary bit value;

*n* spaced independent light sensors, each sensor corresponding to a separate area in each of the *m* portions of the mask and being arranged to produce an output signal when illuminated with light so that the output signal from one or more sensors may be simultaneously detected where *m* and *n* are each greater than one;

means for illuminating each of the *m* portions of the mask, with only one portion being illuminated at a time;

focusing means for projecting and focusing the light passing through each transparent area onto the corresponding sensors, so that the light passing through the corresponding transparent area of each *m* portion is focused at a common point on the respective sensor; and means responsive to the output signals of one or more selected sensors to determine the binary value represented at selected areas to the mask.

2. The combination as defined in claim 1 wherein the illuminating means includes m spaced light emitters and at least one collimating lens disposed between the emitters and the storage mask for projecting collimated light beams on a selected m portion of the mask in response to energization of the corresponding emitter.

3. The combination as defined in claim 1 wherein the focusing means includes at least one combining lens disposed between the mask and the sensors for concentrating the light beams passing through the transparent areas of the mask and focusing said beams on the respective sensors.

4. The combination as defined in claim 2 wherein the focusing means includes at least one combining lens for receiving the collimating light beams passing through the transparent areas of the mask and superimposing the images of each transparent area corresponding to a given sensor on said sensor.

5. The combination as defined in claim 4 wherein the combining lens comprises a segmented primary lens with each segment optically communicating with one of the light emitters.

6. In an optical memory apparatus, the combination which comp^ris_s:

- a plurality of spaced light emitters for emitting light when energized;
- a plurality of spaced independent light sensors for providing output signals when illuminated with light so that the output signals from one or more sensors may be simultaneously detected;
- an optical mask defining a plurality of discrete areas with each area uniquely associated with one emitter and one sensor and being either substantially opaque or transparent to represent a binary bit value;
- means for transmitting a beam of light to every one of the sensors from each of the emitters, when energized during successive intervals such beams of light being directed from each energized emitter to the areas of the mask associated with the energized emitter;
- focusing means responsive to the light beams passing through the transparent mask areas for forming real images of such areas on a designated one of the associated sensors irrespective of which emitter is energized with the images of the mask areas associated with each sensor being superimposed on said designated sensor at successive intervals in response to the energization of selected emitters;
- means for selectively energizing the emitters; and
- means responsive to the output signals of one or more selected sensors to determine the binary bit value represented by selected mask areas.

7. The combination as defined in claim 6 wherein the mask is divided into $m$ portions with each portion defining $n$ discrete areas where $m$ is equal to the number of emitters and $n$ is equal to the number of sensors.

8. The combination as defined in claim 7 including at least one condensing lens positioned between the emitters and the mask.

9. The combination as defined in claim 8 wherein the focusing means including at least one primary lens disposed between the mask and the sensors for focusing the light beams passing through the transparent mask areas on the respective sensors.

10. The combination as defined in claim 9 including one condensing lens positioned between each of the emitters and each of the $m$ portions of the mask and a segmented primary lens disposed between the mask and the sensors with each segment thereof optically communicating with one of the light emitters.

11. In an optical memory apparatus the combination which comprises:

- an optical storage mask divided into $m$ portions, each portion defining $n$ discrete areas with each area being substantially opaque or transparent to represent a binary bit value;
- $n$ spaced independent light sensors arranged on a common plane, each sensor corresponding to a separate area in each of the $m$ portions of the mask and being arranged to produce an output signal when illuminated with light so that the output signal from one or more sensors may be simultaneously detected where $m$ and $n$ are each greater than one;
- an array of relay means disposed a focal length distance from the light emitters for receiving light energy therefrom and projecting collimated light beams onto a selected $m$ portion of the mask; and
- combining lens means disposed between the mask and the sensors for receiving the collimated light beams transmitted through the transparent areas of the mask and for forming real images of said transparent areas only on the plane of the sensors, with the transparent areas which correspond to any particular sensor being superimposed thereon when the emitters are energized one at a time.

12. The combination as defined in claim 11 wherein the array of relay lenses comprises a condensing lens positioned between each light emitter and its respective $m$ portion of the mask.

13. The combination as defined in claim 11 wherein the combining lens means comprises a segmented primary lens with each segment optically communicating with an $m$ portion of the mask.

14. The combination as defined in claim 11 wherein the combining lens means comprises a single primary lens and $m$ relay lenses positioned between the sensor and the mask with each of the $m$ relay lenses positioned between the primary lens and a respective $m$ portion of the mask.

15. In an optical memory apparatus the combination which comprises:

- an optical storage mask divided into $m$ portions, each portion defining $n$ discrete areas with each area being substantially opaque or transparent to represent binary digits;
- $n$ spaced independent light sensors, each sensor corresponding to a separate area in each of the $m$ portions of the mask and being arranged to produce an output signal when illuminated with light so that the output signals from one or more sensors may be simultaneously detected where $m$ and $n$ are each greater than 1;
- means for illuminating each of the $m$ portions of the mask with collimated beams of light with only one portion being illuminated at a time;
- lens means for projecting substantially all of the light passing through corresponding transparent areas of the $m$ portions of the mask to the same point on a respective sensor; and
- means responsive to the output signals of one or more selected sensors to determine the binary value represented by selected areas of the mask.

16. The combination as defined in claim 15 wherein the means for illuminating each of the m portions of the mask comprises $m$ spaced independent light emitters and a separate condensing lens positioned between each light emitter and the respective $m$ portion of the mask.

17. The combination as defined in claim 16 wherein the lens means comprises at least one primary lens positioned between the mask and the sensors for superimposing the images of the mask areas associated with each sensor on said sensor.

18. The combination as defined in claim 17 wherein the lens means comprises a segmented primary lens with each segment thereof optically communicating with a respective $m$ portion of the mask.

* * * * *